United States Patent
Brodie et al.

(10) Patent No.: US 7,251,562 B1
(45) Date of Patent: *Jul. 31, 2007

(54) NETWORK ASSISTED PSEUDOLITE ACQUISITION FOR ENHANCED GPS NAVIGATION

(75) Inventors: Keith Jacob Brodie, Irvine, CA (US); David Allan Tuck, El Segundo, CA (US)

(73) Assignee: SiRF Technology, Inc., San Jose, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 10/385,301

(22) Filed: Mar. 10, 2003

Related U.S. Application Data

(63) Continuation of application No. 09/960,828, filed on Sep. 21, 2001, now Pat. No. 6,597,988.

(60) Provisional application No. 60/234,856, filed on Sep. 22, 2000.

(51) Int. Cl.
*G01C 1/00* (2006.01)

(52) U.S. Cl. .................................. 701/213; 342/357.01

(58) Field of Classification Search ................ 701/207, 701/213, 214, 215, 216; 342/357.01–357.12; 455/456, 457
See application file for complete search history.

(56) References Cited

U.S. PATENT DOCUMENTS

| | | | | |
|---|---|---|---|---|
| 5,646,630 A | * | 7/1997 | Sheynblat et al. | ..... 342/357.14 |
| 5,949,371 A | * | 9/1999 | Nichols | .................. 342/357.01 |
| 6,052,083 A | * | 4/2000 | Wilson | .................. 342/357.17 |
| 6,121,928 A | * | 9/2000 | Sheynblat et al. | .......... 342/463 |
| 6,140,957 A | * | 10/2000 | Wilson et al. | ......... 342/357.08 |
| 6,271,788 B1 | * | 8/2001 | Longaker et al. | ...... 342/357.03 |
| 6,324,455 B1 | * | 11/2001 | Jackson | ....................... 701/50 |
| 6,430,416 B1 | * | 8/2002 | Loomis | ................... 455/456.1 |
| 6,597,988 B1 | * | 7/2003 | Brodie et al. | ............... 701/213 |
| 6,771,625 B1 | * | 8/2004 | Beal | .......................... 370/336 |

* cited by examiner

*Primary Examiner*—Richard M. Camby
(74) *Attorney, Agent, or Firm*—The Eclipse Group LLP

(57) ABSTRACT

The invention comprises a set of pseudolites deployed throughout an area of interest in which the GPS constellation visibility may be limited, such as in and around some high-rise buildings in an urban setting, and a database of these installed pseudolite locations with their PRN numbers indexed by cell-site. When the cellular telephone is in communication with a particular tower or transceiver, the PRN numbers of all local pseudolites are transmitted to the cellular telephone. If the cellular telephone has a position solution which has been transmitted to the cell tower, prepositioning information for a code search can be transmitted to the phone as well. The phone can then augment the phone's normal acquisition list with the pseudolites in the area and track the pseudolites to augment navigation capabilities in a harsh environment.

14 Claims, 2 Drawing Sheets

NETWORK ASSISTED PSEUDOLITE ACQUISITION FOR ENHANCED GPS NAVIGATION

CROSS-REFERENCE TO RELATED APPLICATIONS

This is a continuation of application Ser. No. 09/960,828, filed Sep. 21, 2001, now U.S. Pat. No. 6,597,988 titled "NETWORK ASSISTED PSEUDOLITE ACQUISITION FOR ENHANCED GPS NAVIGATION," which is hereby incorporated by reference.

This application claims priority under 35 U.S.C. § 119(e) of United States Provisional Patent Application No. 60/234,856, filed Sep. 22, 2000, entitled "NETWORK ASSISTED PSEUDOLITE ACQUISITION FOR ENHANCED GPS NAVIGATION," by Keith J. Brodie et al., which application is incorporated by reference herein.

BACKGROUND OF THE INVENTION

1. Field of the Invention

The present invention relates in general to Satellite Positioning System (SATPS) receivers, and in particular to a network assisted pseudolite acquisition for enhanced SATPS navigation.

2. Description of the Related Art

Cellular telephony, including Personal Communication System (PCS) devices, has become commonplace. The use of such devices to provide voice, data, and other services, such as internet access, has provided many conveniences to cellular system users.

A current thrust in the cellular and PCS arena is the integration of Global Positioning System (GPS) technology, which is a subset of SATPS technology, into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 20 feet once an emergency call, such as a "911" call (also referred to as Enhanced 911 or "E911") is placed by a given cellular telephone. Such position data assists police, paramedics, and other law enforcement and public service personnel, as well as other agencies that may need or have legal rights to determine the cellular telephone's position. Further, GPS and/or SATPS data can be used by the cellular user for directions, location of other locations that the cellular user is trying to locate, determination of relative location of the cellular user to other landmarks, directions for the cellular user via internet maps or other GPS/SATPS mapping techniques, etc. Such data can be of use for other than E911 calls, and would be very useful for cellular and PCS subscribers.

However, since cellular telephones can travel into areas where SATPS signals cannot be reliably received, augmentations to the SATPS system are being researched to support the E911 and other SATPS/cellular applications. SATPS is increasingly being pressed into service in the cellular telephone/PDA/mobile computer application where a solution is required in areas with substantial blockage, such as inside buildings, in subway stations, and other areas where the system RF link budget is unable to sustain communications with mobile units that travel into hostile signal reception environments such a buildings. Pseudolites are well-known commercially available ground-based transmitters which augment the orbiting SATPS constellation with one or more additional transmitters to improve the availability and quality of a SATPS solution. Current pseudolite applications include local-area augmentation system (LAAS) transmitters for precision approach.

It can be seen, then, that there is a need in the art for a method and apparatus for assisting the cellular network in locating cellular telephones. It can also be seen that there is a need in the art for a method and apparatus for assisting the network in locating cellular telephones in hostile signal environments such as buildings. It can also be seen, then that there is a need in the art for methods and apparatuses for assisting a mobile user in a harsh signal environment using extra-network devices such as pseudolites.

SUMMARY OF THE INVENTION

To minimize the limitations in the prior art, and to minimize other limitations that will become apparent upon reading and understanding the present specification, the present invention discloses methods and apparatuses for assisting the cellular network, or other type of network, with SPS acquisition, tracking, and navigation using extra-network devices such as pseudolites.

The invention comprises a set of pseudolites deployed throughout an area of interest in which the SATPS constellation visibility may be limited, such as in and around some high-rise buildings in an urban setting, and a database of these installed pseudolite locations with their PRN numbers indexed by cell-site. When the cellular telephone is in communication with a particular tower or transceiver, the PRN numbers of all local pseudolites are transmitted to the cellular telephone. The data transmitted for each pseudolite could be simply the pseudolite ID, the ID and position of the pseudolite, or the ID and the complete data message for the pseudolite (which would include it's position). The phone can then augment the phone's normal acquisition list with the pseudolites in the area and track the pseudolites to augment navigation capabilities in a harsh environment. The advantage of having the pseudolite ID's transmitted to the SATPS receiver for addition to the acquisition list is that they are usually not looked for at all, because they are infrequently available. In GPS, for example, pseudorandom code numbers (PRNs) 1 to 32 are reserved for space vehicles, and PRNs 33 through 37 are reserved for pseudolites. Since pseudolites are local area transmitters, these PRNs may be reused in different geographic areas without interference. A conventional GPS receiver, however, would not search ID's 33 through 37 for potential pseudolites because of their deployment is very rare. Searching for transmitters that have not been deployed wastes power and time in the GPS receiver. The present invention extends the conventional SATPS system by providing the list of available pseudolite PRNs to SATPS systems which may benefit from tracking them because of the obstructed signal environment.

The position of the pseudolite may be transmitted by the cell base station as well. If the position is transmitted, it can be used by the SATPS to compute, a prepositioning range and range-rate for the pseudolite for faster acquisition of the pseudolite signal. Alternatively, if the cellular telephone has a position solution which has been transmitted to the cell tower, prepositioning information for a code search can be transmitted to the phone. If the pseudolite position and any required dock correction terms are transmitted by the cell base station to the SATPS receiver, then the pseudolite pseudorange may be used in the SATPS navigation computation before the pseudolite data message has been decoded directly from the pseudolite transmission, thus making it available for use in assisting navigation sooner. If all of the data in the pseudolite data message is transmitted to the SATPS by the cell base station, the data message in the actual pseudolite signal can be stripped off of the incoming signal. In the case of a GPS pseudolite, this allows coherent tracking of the pseudolite signal beyond the 20 millisecond (ms) boundary normally imposed by the data rate in the modulating bi-phase shift keyed (BPSK) code.

In another embodiment of the invention, the pseudolite information is transmitted to the mobile user via a broadcast mechanism, with no communication from the mobile user back to the source transmitting the local pseudolite information. An FM broadcast station sub-carrier would be well suited to this task, because the limited range of the FM broadcast availability may be consistent with the range of the signals transmitted by the pseudolites identified in the FM sub-carrier broadcast. So, for example, in a city with a local FM station, the sub-carrier broadcasts the ID numbers of the pseudolites available in the city. As in the case of the cellular network based system, the broadcast may also include the pseudolite positions, the pseudolite clock corrections, or the entire pseudolite data message. In any of these cases, the SATPS receiver, augmented with the sub-carrier receiver, picks up the ID's and any other pseudolite information, and is therefore able to acquire, track, and navigate with signals from the local pseudolites as well as the satellites. The resultant navigation fixes may be for use locally by the mobile user, or they could be transmitted to through another network, such as the cellular telephone network, to support E911, fleet management, and other applications. The mechanism for transmitting the pseudolite aiding information can be one-way and need not be associated with the transmission of navigation data from the mobile user.

It is an object of the present invention to provide a method and apparatus for assisting the cellular network in locating cellular telephones. It is another object of the present invention to provide a method and apparatus for assisting the network in locating cellular telephones in hostile signal environments such as buildings. It is a further object of the present invention to provide methods and apparatuses for assisting the network using extra-network devices such as pseudolites.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention is embodied in hardware and/or software that is used to perform the computations described above. Different embodiments of the invention may be used to perform different types of calculations, e.g., a single integrated circuit or piece of software can be used to perform the time ambiguity calculation, a second integrated circuit or piece of software can be used to perform the z-direction ambiguity calculation, or a single integrated circuit or piece of software can be used to perform all calculations described by the present invention. The apparatus is not limiting to the applications of the present invention.

Figure 1:
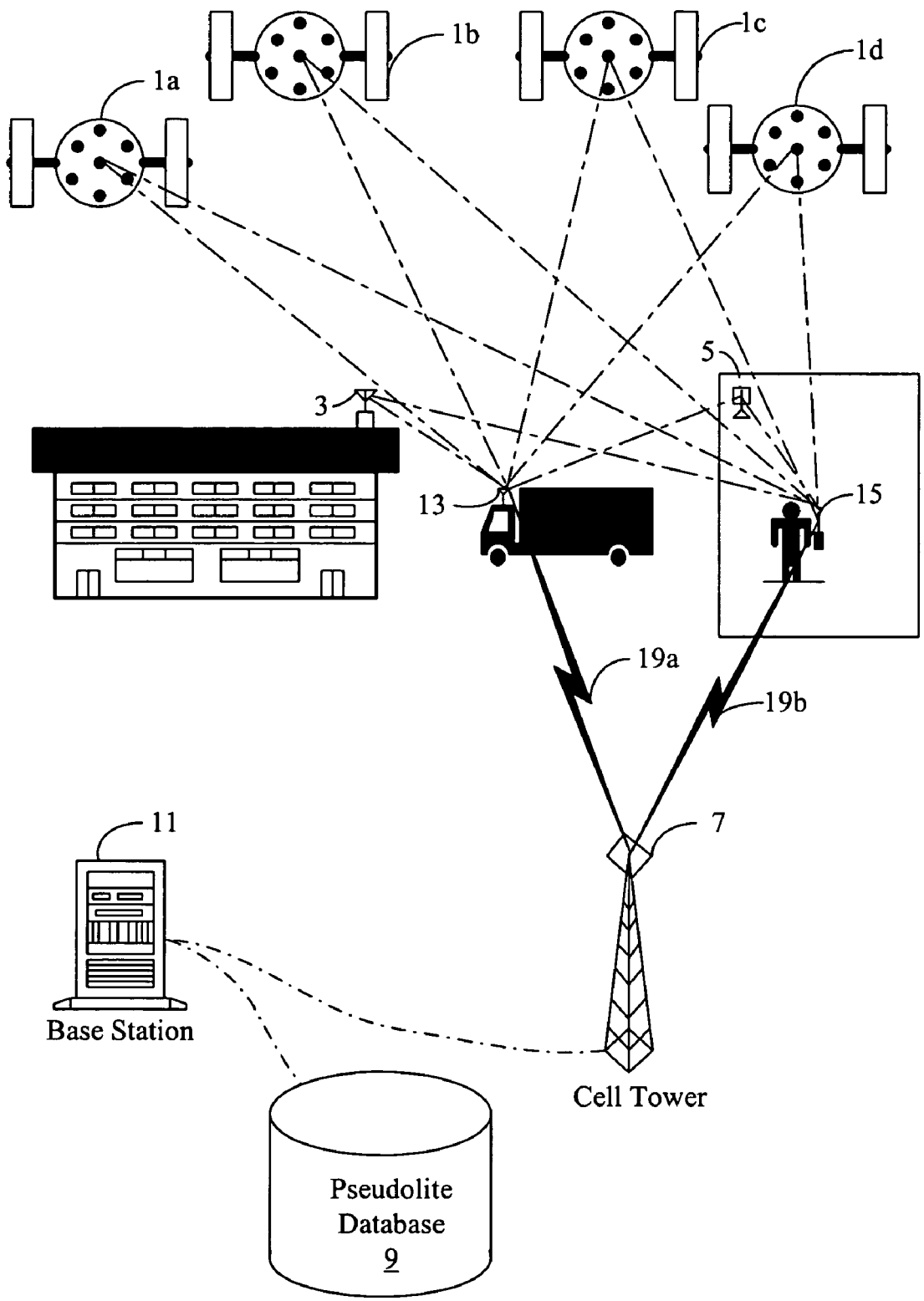
FIG. 1 is a diagram showing the communication links and operation of the invention for two different users connected to a single cell tower.

FIG. 1 is a diagram showing the communication links and operation of the invention for two different users connected to a single cell tower.

FIG. 1 illustrates a set of SATPS transmitters 1.$a,b,c,d$, such as GPS satellites. The diagram also shows two pseudolites, one mounted on the roof of a building 3, the second mounted inside of a building 5. The satellites and pseudolite transmissions are received by users. Two users are shown, a person with a SATPS-equipped cellular telephone in a building 15, and a truck with a SATPS receiver and cellular telephone transceiver onboard 13.

The users 13, 15 are in communication with a cell phone base station indicated by the cell tower 7, the base station transceivers(s) and controller(s) 11 and a pseudolite database 9. The pseudolite database is maintained in a computer. It may be maintained locally, as shown, or at some more centralized location.

In operation, the user's 13,15 cellular telephone equipment identifies itself as SATPS equipped and capable of tracking pseudolites to the base station 11 over the communications links 19 $a$ and 19 $b$. The base station obtains the list of pseudolites in close range to the tower from the pseudolite database, and transmits to the user equipment the ID codes of the pseudolites 3,5 deployed in the area. The transmitted pseudolite information may include 1. the pseudolite ID's only; 2. the ID's and their locations; 3. the ID's and the content of their entire data message, including location. The SATPS receivers in the user equipment 13,15, add the pseudolite ID's to their search lists, so they can search for, acquire, and track the local pseudolites. If the location information was transmitted, the pseudolite can be used for navigation before the data is decoded. The pseudolite signals provide for improved navigation, and may be sufficient to compensate for signals lost for the indoor user 15.

Typical Scenario Using the Present Invention

Figure 2:
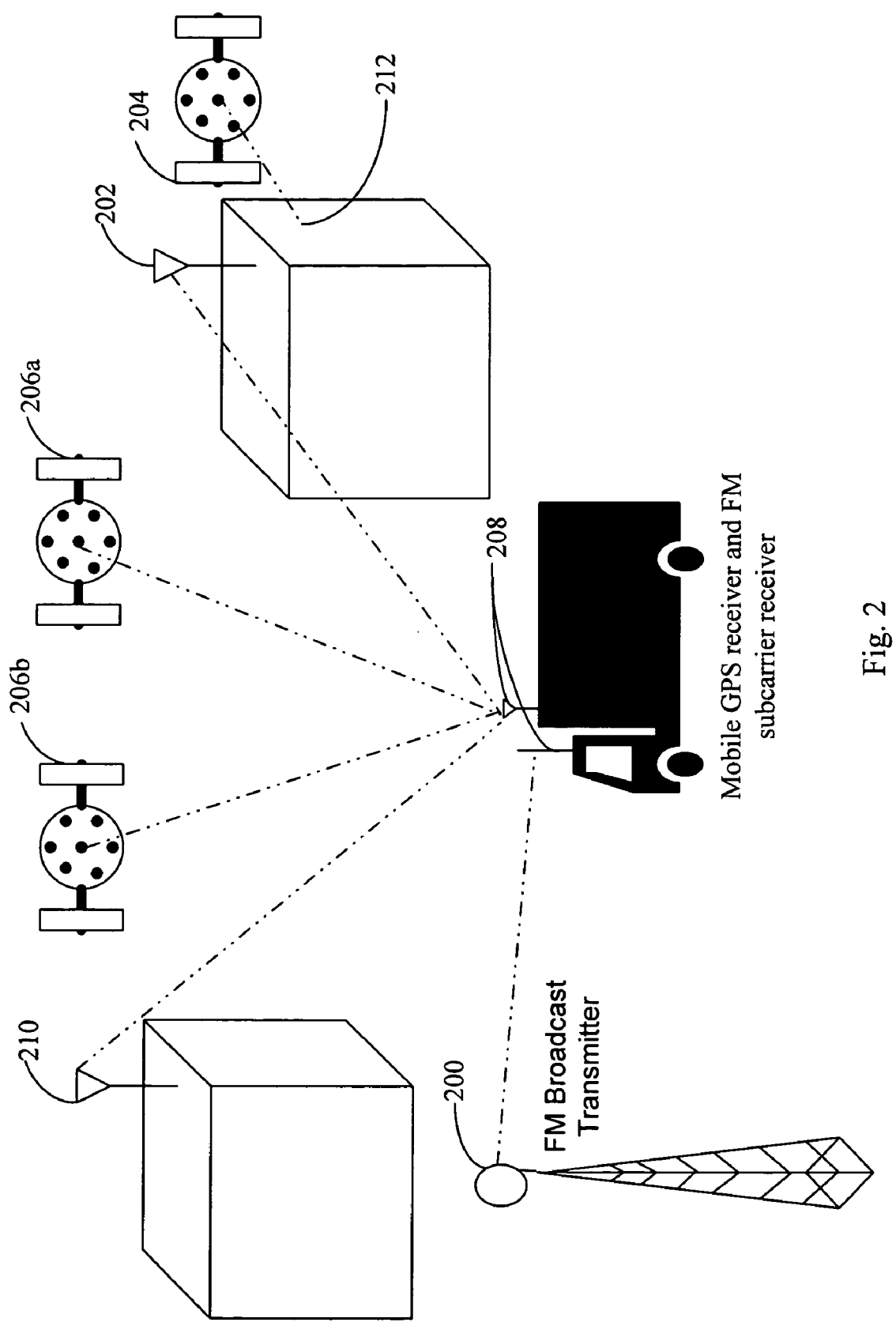
FIG. 2 illustrates a typical scenario using the present invention in a different embodiment with the pseudolite data broadcast on an FM sub-carrier.

FIG. 2 illustrates a typical scenario using the present invention in a different embodiment with the pseudolite data broadcast on an FM sub-carrier. Although a single scenario is illustrated, it is understood that other scenarios are possible given the teachings of the present invention. The scenario of FIG. 2 is for illustrative purposes only, and is in no way intended to limit the scope of the present invention.

In FIG. 2, the mobile user 208 is a receiving only user, i.e., user 208 cannot transmit signals to any other receiver. However, in other scenarios, user 208 may have transmit capabilities. GPS transmissions are being received from satellites 206 $a,b$ and from pseudolites 202,210. An FM broadcast sub-carrier is being received from the local FM station 200. The GPS transmission from another satellite 204 is being blocked by a building 212, typical of a harsh urban signal environment. The FM sub-carrier transmission has identified the PRN numbers for the local pseudolites 202, 210, so the GPS receiver at the mobile user 208 can add the pseudolites 202 and 210 to the search list, acquire the pseudolites 202 and 210, and track them along with the GPS satellites 206*a* and 206*b*. The process of satellite signal acquisition and tracking is described in "Understanding GPS Principles and Applications," by Kaplan, pp 119–208 which is herein incorporated by reference.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. An enhancement system for a Satellite Positioning System (SATPS), comprising:
    at least one pseudolite deployed in a geographical region of interest;
    a centrally located database comprising a geographical position related to each of the deployed pseudolites; and
    a transmitter capable of transmitting at least a portion of the centrally located database comprising the geographical position of the deployed pseudolites to a SATPS receiver for use in determining a position of the SATPS receiver.

2. The enhancement system of claim 1, wherein the deployed pseudolites are deployed in a geographical area that has a limited SATPS constellation visibility.

3. The enhancement system of claim 2, wherein the centrally located database is indexed.

4. The enhancement system of claim 3, wherein the centrally located database is indexed by cellular telephone system cell site.

5. The enhancement system of claim 4, wherein the SATPS system is a Global Positioning System (GPS).

6. The enhancement system of claim 5, wherein the transmitter is part of a cellular telephone system.

7. The enhancement system of claim 6, further comprising a transmitter is capable of transmitting the geographical position of the deployed pseudolites to the cellular telephone system.

8. The enhancement system of claim 7, wherein the cellular telephone system is capable of transmitting propositioning information for a code search from the cellular telephone system to the SATPS receiver.

9. The enhancement system of claim 5, wherein the transmitter is a one-way broadcast mechanism.

10. The enhancement system of claim 9, wherein the one-way broadcast mechanism is an FM broadcast station.

11. An interface to a Satellite Positioning System (SATPS) receiver, wherein the interface is capable of inputting local pseudolite information, wherein the local pseudolite information is selectively used by the SATPS receiver for determining the geoposition of the SATPS receiver.

12. The interface of claim 11, wherein the interface is separate from SATPS antenna input used for receiving SATPS signals.

13. The interface of claim 11, wherein the local pseudolite information comprises a pseudolite PRN number.

14. The interface of claim 13, wherein the local pseudolite information comprises a geographical location of the pseudolite.

* * * * *